United States Patent
Dennewitz

[15] 3,685,409
[45] Aug. 22, 1972

[54] APPARATUS FOR REGULATING THE LIGHT ENERGY DECAY CHARACTERISTIC OF A PULSED FLASH DEVICE

[72] Inventor: Rolf Dieter Dennewitz, Berlin, Germany

[73] Assignee: Loewe Opta GmbH, Berlin, Germany

[22] Filed: May 11, 1970

[21] Appl. No.: 35,992

[30] Foreign Application Priority Data

March 6, 1970 Germany..........P 20 11 534.8

[52] U.S. Cl.................95/11 R, 95/10 C, 95/11.5 R, 315/151
[51] Int. Cl....G03b 15/02, G03b 15/05, H05b 41/00
[58] Field of Search.............95/11 R, 10 C, 11.5 R; 240/1.3; 315/151

[56] References Cited

UNITED STATES PATENTS

| | | |
|---|---|---|
| 3,541,387 | 11/1970 | Ackermann...............315/151 |
| 3,293,449 | 12/1966 | Gutzwiller..............307/252 K |
| 3,509,422 | 4/1970 | Kilgore.....................315/151 |

*Primary Examiner*—Samuel S. Matthews
*Assistant Examiner*—Robert P. Greiner
*Attorney*—Arthur O. Klein

[57] ABSTRACT

A pair of threshold-operated, normally non-conductive cascaded thyristors are connected in shunt with a flash tube for rapidly interrupting the output of the tube when a predetermined quantity of light energy has been emitted therefrom. A photosensitive film is exposed to a portion of the light energy emitted from the flash tube and yields an optical density characteristic which is proportional to the predetermined quantity of the light energy except when the exposure time is extremely short. This deviation from proportionality for short exposure times is compensated by coupling a suitably valued resistor in the transconductive path of each of the thyristors to delay the extinction of the flash after interruption. The resistance value is chosen to provide sufficient residual flash exposure of the film to raise its optical density to a value more nearly proportional to the predetermined quantity of light.

2 Claims, 2 Drawing Figures

PATENTED AUG 22 1972 3,685,409
FIG.1
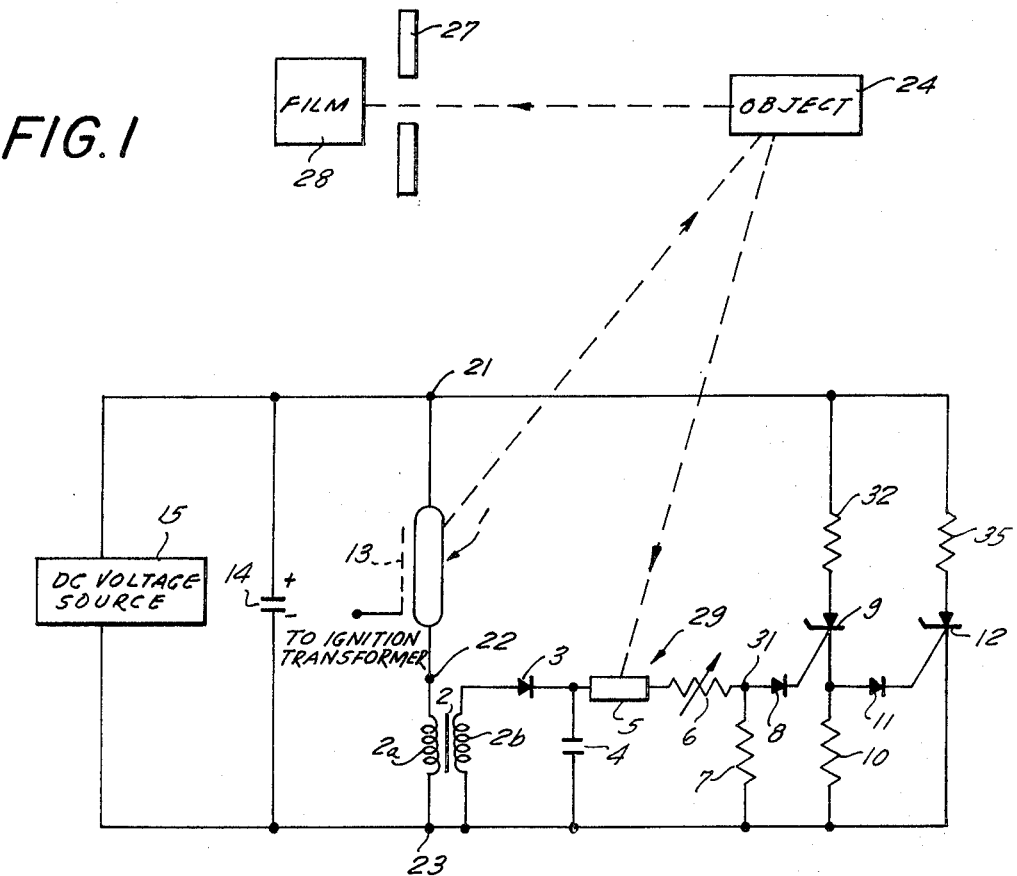
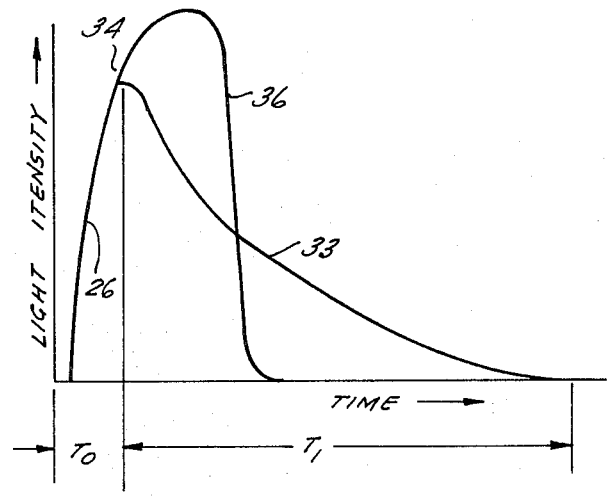
FIG.2
INVENTOR
Rolf Dieter DENNEWITZ
BY
Arthur O. Klein
ATTORNEY

APPARATUS FOR REGULATING THE LIGHT ENERGY DECAY CHARACTERISTIC OF A PULSED FLASH DEVICE

BACKGROUND OF THE INVENTION

Photosensitive emulsions employed in films suitable for use in high-speed flash apparatus normally exhibit, when exposed, an optical image density which is determined solely by the total amount of light energy absorbed by the film and is thus independent of the rate of absorption, i.e., the exposure time. This relation, which embodies Bunsen and Roscoe's reciprocity law for photochemical reactions, no longer applies when the flash illumination time becomes extremely short, e.g., one five-hundredths of a second and below. At such short exposure times, the optical density of the exposed film assumes a value that is less than proportional to the absorbed light energy.

Such short exposure times may be encountered, e.g., in pulsed flash devices that employ light integrating means for automatically adjusting their operating duration. Such devices commonly employ a gas discharge tube in shunt with the flash tube to quench the flash when the integrated light energy derived from the emission of the flash tube (e.g., reflected from the illuminated object) has reached a predetermined value. Examples of such automatically adjusted flash devices are described, e.g., in U. S. Pat. No. 3,033,911 issued to H. E. Edgarton and in U. S. Pat. Nos. 3,350,608 and 3,350,604 issued to R. D. Erickson.

Since the threshold light energy of such automatically regulated devices is predetermined, it is evident that as the object distance becomes shorter, the light intensity of the reflected flash becomes correspondingly greater. Hence, progressively shorter exposure times are needed to reach the threshold exposure energy and in many cases the exposures required for small object distances (e.g., 0.5 meters) are sufficiently short to cause failure of the reciprocity law.

When such failure is reached with the use of black and white film, the result is loss of film contrast, stability, and sensitivity. Moreover, when color film is used, such failure additionally causes each of the three colored layers in the film to be affected differently, thereby causing a shift in color balance.

It is possible to compensate for such loss of reciprocity by certain well-known expedients, e.g., manually enlarging the shutter opening in the flash camera when such extremely short exposure times are employed. Such expedient, however is not satisfactory when automatically regulated flash devices of the above-mentioned type are used, since such manual shutter adjustments will necessarily destroy the desired fully automatic feature of the device operation.

Since light flash in such regulated devices can not be instantaneously quenched upon the attaining of the threshold value of light energy, the film continues to be exposed to the residual light energy during the decay of the flash. However, the gas discharge quench tubes normally employed in these devices have such small internal resistances that the discharge time constant of the flash tube output circuit during quench is very low. Hence, with extremely short exposure times, insufficient residual light energy falls on the photosensitive film to appreciably increase its optical density.

SUMMARY OF THE INVENTION

The problem of compensating for loss of reciprocity in a photosensitive film associated with an automatically regulated high speed flash device of the above type at extremely short exposure times has been solved by the arrangement of the instant invention. Illustratively, at least one normally disabled thyristor has its transconductive path coupled in shunt across the flash tube for bypassing exciting energy from the flash tube when the control electrode of the thyristor is excited. Such control electrode is connected to the output of a light integrating arrangement that is rendered effective at the start of the flash for generating a control signal proportional to the integrated light energy contained in the flash tube emission. When the control signal has reached a value indicative of a predetermined quantity of light energy, the control electrode of the thyristor is triggered to interrupt the flash. Time-constant regulation means are connected in the transconductive path of the thyristor for delaying the extinction of the flash after such interruption, so that the residual exposure of the film after interruption is sufficient to increase its optical density to a value more nearly proportional to the predetermined quantity of light energy. The required regulation of the discharge time constant is rendered possible by the relatively long light energy decay characteristic exhibited by a typical flash tube when shunted by a thyristor, as opposed to the corresponding characteristic of the flash tube when shunted by a gas discharge quench tube.

In one illustrative embodiment, a pair of cascaded thyristors are connected across the flash tube. The input thyristor is triggered by the control signal, and a resistor in series with such thyristor responds to the resulting flow of current therethrough to develop a voltage that is applied to the control electrode of the output thyristor. The latter is instantaneously switched into conduction to absorb the remaining bypassed energy from the flash tube.

BRIEF DESCRIPTION OF THE DRAWING

The nature of the invention and its advantages will appear more fully from the following detailed description taken in conjunction with the appended drawing, in which:

FIG. 1 is a pictorial diagram of an automatically adjusted, thyristor-quenched high speed flash arrangement whose light energy decay characteristic may be regulated in accordance with the invention; and FIG. 2 is a set of curves illustrating the relative light emission characteristics of a flash device that is quenched by a thyristor and a gas discharge tube, respectively.

DETAILED DESCRIPTION

Referring now to the drawing, FIG. 1 depicts a conventional flash tube 1 (illustratively a gas filled envelope) whose light energy decay characteristic is to be regulated in accordance with the invention. The tube 1 is provided with a pair of excitation terminals 21 and 22. A primary winding 2a of a transformer 2 is connected between the terminal 22 and a common terminal 23 of the flash unit. A flash capacitor 14 is connected across the terminals 21 and 23.

The capacitor 14 may be selectively charged in a known manner with a relatively high potential of the polarity shown from a conventional DC power source 15.

The flash tube 1 is further provided with a trigger electrode 13. While not specifically illustrated in the drawing, the trigger electrode may be coupled to the secondary winding of a conventional ignition transformer whose primary winding may be excited by a synchronizing pulse in a known manner.

The voltage of the charged flash capacitor 14 is not normally sufficient by itself to cause emission of light energy from the tube 1. However, as is well known, such tube will emit light upon the concurrent application of an igniting pulse to the trigger electrode 13 through its associated ignition transformer. The resulting flash of light energy produced in the tube 1 is emitted through the walls of the tube envelope to a suitable object designated 24; and the emitted light intensity builds up rapidly as shown by a curve segment 26 in FIG. 2. A portion of the light reflected from the object 24 (FIG. 1) is directed in a known manner through a shutter 27 and onto a suitable light sensitive film 28. The shutter 27 and the film 28 being associated with the flash tube 1 in a well-known manner. Another portion of the light reflected from the object 24 is detected by a photosensitive element 5 (illustratively a light sensitive resistor) which is connected in a light integrating circuit 29 in the manner described below. It will be appreciated by those skilled in the art that the reflected flash energy passing through the shutter 27 will ideally expose the film 28 in accordance with the normal law of reciprocity governing photochemical operations i.e., the optical film density resulting from its exposure to the reflected flash light through the shutter 27 will normally be proportional to the amount of light energy absorbed (e.g., the integral of the segment 26 of FIG. 2) and will normally be independent of the exposure time itself.

When the required coincidence occurs between the igniting pulse voltage on the trigger electrode 13 (FIG. 1) and the flash capacitor voltage across the terminals 21 and 23, the resultant conduction of the flash tube (a) causes light energy to be emitted toward the object 24, and (b) causes a pulse of current to pass through the primary winding 2a of the transformer 2. A corresponding voltage pulse is thereby generated across a secondary winding 2b of the transformer 2. Such voltage pulse is coupled through a rectifying diode 3 to establish a voltage across a capacitor 4.

A voltage divider consisting of the light sensitive resistor 5 and additional pair of resistors 6 and 7 (the former being adjustable) is connected across the capacitor 4. The resulting potential appearing at a junction 31 of the resistors 6 and 7, which junction forms the output of the light integrating circuit 29, is coupled through a diode 8 to the control electrode of a first normally disabled thyristor 9. The transconductive path of the thyristor 9 is connected through a pair of resistors 10 and 32 across the terminals 21 and 23 for shunting the flash tube 1. Such transconductive path is therefore conditioned for operation whenever the flash capacitor 14 is in its charged state. The values of the resistors 10 and 32 are chosen to help adjust the time constant of the discharge path of the flash tube 1 to yield a desired flash decay characteristic. Such decay characteristic is depicted as a curve segment 33 in FIG. 2. The segment 33 commences at a point 34, which terminates the segment 26 and marks the moment of interruption of the flash tube energy by the light integrating circuit 29 in the manner described below. This moment of interruption is shown as occurring at a time $T_0$ (hereafter designated as the "primary exposure time") after the commencement of the flash.

A second normally disabled thyristor 12 is connected in cascade with the thyristor 9 across the flash tube 1 to absorb a portion of the flash capacitor energy bypassed from the flash tube 1 during a quenching operation as described below. To this end, a junction of the resistor 10 and the cathode of the first thyristor 9 is connected through a second isolating diode 11 to the control electrode of the second thyristor 12. The transconductive path of the thyristor 12 is connected through a resistor 35 across the terminals 21 and 23 so that the thyristor 12 is also normally conditioned for operation by the voltage on the flash capacitor 14. The value of the resistor 35 is chosen, like that of resistors 10 and 32, to help adjust the time constant of the discharge path of the flash tube 1 to yield the desired flash decay characteristic.

The characteristic of the thyristors 9 and 12 may be selected such that the thyristor 12 is immediately triggered into conduction by the voltage developed across the resistor 10 by the current resulting when the thyristor 9 is driven into conduction.

Conduction of the thyristor 9 is initiated by the action of the light integrating circuit 29. In particular, when the flash tube 1 is triggered into conduction, the voltage on the capacitor 4 builds up at a rate determined by variations in the resistance of the light sensitive resistor 5. Such variations are in turn proportional to the intensity of the light reflected to the resistor 5 from the illuminated object 24.

With this arrangement, the voltage across the capacitor 4, and therefore the proportional voltage at the junction 31, is indicative of a quantity proportional to the total integrated reflected light from the object 24. The thyristor 9 will accordingly conduct when the potential at the junction 31 has built up to a point that exceeds the characteristic threshold triggering level at the control electrode of the thyristor 9.

With the arrangement shown in FIG. 1, it will be observed that no current flows through the primary winding 2a of the transformer 2 prior to the start of light emission from the tube 1. Thus, no voltage is initially developed across the secondary winding 2b and the capacitor 4 is at zero potential. The corresponding zero potential at the junction 31 will maintain the initially nonconductive thyristors 9 and 12 in their disabled states, and both thyristors will appear as open circuits across the flash tube 1.

In operation, when a pulse is applied to the trigger electrode 13 of the flash tube 1 through its ignition transformer to cause the tube to emit light, the resulting pulse of current through the primary winding 2a will generate a pulse of charging current applied to the capacitor 4 through the secondary winding 2b and the diode 3. The voltage across the capacitor 4 therefore builds up in a manner determined by the characteristic of the light sensitive resistor 5 in response to the light reflected thereto from the object 24. The resulting potential at the junction 31 builds up in proportion to the total light energy integrated by the circuit 29.

When the emission of light from the tube 1 has persisted for a duration long enough (illustratively the interval $T_0$) to permit the voltage at the control electrode of the thyristor 9 to exceed its threshold trigger value, the thyristor 9 is rapidly driven into conduction to effectively present a relatively low impedance across the flash tube 1. A portion of the energy from the flash capacitor 4 is thereupon bypassed from the flash tube 1 to the now conductive thyristor 9 to commence the quenching operation. (As explained below, such quenching will not occur instantaneously because of the characteristics of the thyristor 9 and the resistances 10 and 32 in series therewith).

When the thyristor 9 conducts, the resulting surge of current through its transconductive path causes a proportional voltage to be developed across the resistor 10. Such voltage, applied to the control electrode of the second thyristor 12 through the diode 11, now drives the thyristor 12 into conduction to further lower the total impedance across the tube 1 and cause the absorbtion of the remaining energy from the flash capacitor 14, thereby preventing overloading of the thyristor 9.

The total exposure energy of the film 28 during the primary flash interval will be proportional to the integral of the build-up curve segment 26 over the interval $T_0$. After the time $T_0$, the flash characteristic of the tube 1 decays along the segment 33 as the energy from the flash capacitor 14 is shunted from the tube 1 by the now conductive thyristors 9 and 12. Because of the effect, on the time constant of the flash tube discharge circuit, of the resistors 10, 32, and 35, the decay segment 33 can be made to extend for an appreciable interval $T_1$ after the start of quench. The total energy under the segment 33 represents the residual flash exposure to which the film 28 is subjected after the start of quench, and will result in an additional increment of optical film density.

During primary exposure times above about one five-hundredths of a second, the total optical density of the exposed film 28 is generally proportional, because of the action of the reciprocity law, to the absorbed light energy, which in turn is proportional to the integral of the curve segment 26 (FIG. 2) over the time $T_0$. However, for primary exposure times less than about one five-hundredths of a second, the optical film density will be less than a value proportional to the time integral of the curve 26.

In accordance with the invention, therefore, the values of the resistors 10 and 32 in the transconductive path of the thyristor 9 and the resistor 35 in the transconductive path of the thyristor 12 are chosen to adjust the decay segment 33 in FIG. 2 such that the residual energy represented by the area under the segment 33 brings the total optical density of the exposed film 28 up to its desired value. Such desired value is proportional to the energy absorbed by the film during the primary exposure time $T_0$, thereby compensating for the loss of reciprocity at extremely shorth exposure times (for comparison, a curve 36 showing the much shorter decay characteristic and lower residual light energy of a flash tube shunted by a gas discharge quench tube is depicted in FIG. 2.)

In a practical embodiment of the arrangement depicted in FIG. 1 wherein the desired compensation for reciprocity law failure was accomplished for a typical exposure time $T_0$ of one five-hundredths of a second, the capacitors 4 and 14 were each 560 $\mu f$; the resistances 32 and 35 were each 0.8 ohms; the flash tube 1 had a 30 millimeter illumination length; and each of the thyristors 9 and 12 was a Valvo type BT100A/500 R.

The level of reflected light energy from the object 24 necessary to trigger the thyristors 9 and 12 via circuit 29 may be regulated, e.g., by suitably varying the value of the adjustable resistor 6.

It will be understood that the above-described embodiment is merely illustrative of the principles of the invention. Numerous other modifications will now occur to those skilled in the art. For example, if the discharge current requirements during quench are not too severe, a single thyristor and an associated time constant-determining resistor may be connected in shunt across the flash tube in place of the cascaded arrangement shown. Alternatively, an appropriate time constant-determining impedance may be employed in connection with a thyristor switch that is serially coupled in the path between the flash capacitor 14 and the flash tube 1, rather than in shunt across the flash tube. Such a serial thyristor arrangement is described, in e.g., copending applications Ser. Nos. 874,935 and 17,841 filed respectively Nov. 7, 1969, and Mar. 9, 1970 and entitled respectively: "ELECTRONIC FLASH UNIT WITH A DEVICE FOR REGULATING THE DURATION OF THE FLASH" and "PULSED FLASH TUBE REGULATOR USING THYRISTOR GATE CONTROL." Accordingly, it is desired that the scope of the appended claims not be limited to the specific disclosure herein contained.

What is claimed is:

1. In an apparatus for rapidly interrupting the output of a high-speed flash tube, coupled to a flash capacitor, when a predetermined quantity of light energy has been emitted therefrom, wherein a portion of the emitted light energy is reflected onto a photosensitive film to expose the film to yield a film optical density distribution that is normally proportional to the predetermined quantity of light energy but that is normally less than proportional to the predetermined quantity when the exposure time of the film falls below a prescribed value, an arrangement for compensating for the deviation from proportionality at such short exposure times, which comprises:

means rendered effective at the start of the flash for generating a control signal that varies in proportion to the light energy emitted from the flash tube;
at least one normally disabled thyristor;
resistive means for connecting the transconductive path of the thyristor across the flash tube to establish a shunting path for the flash tube to interrupt the emitted light energy when the control electrode of the thyristor is excited, the resistance of the resistive means being sufficiently low so that the resistance of the shunting path is lower than that of the flash tube but sufficiently high relative to the thyristor to set the resulting time constant of the shunting path and the flash capacitor at a value which delays the extinction of the emitted light energy after such interruption for an interval sufficient to make the film optical density more nearly proportional to the predetermined quantity of light energy, and means for coupling the output of the generating means to the control electrode of the thyristor.

2. In an apparatus for rapidly interrupting the output of a high-speed flash tube, coupled to a flash capacitor, when a predetermined quantity of light energy has been emitted therefrom, wherein a portion of the emitted light energy is reflected onto a photosensitive film to expose the film to yield a film optical density distribution that is normally proportional to the predetermined quantity of light energy but that is normally less than proportional to the predetermined quantity when the exposure time of the film falls below a prescribed value, an arrangement for compensating for the deviation from proportionality at such short exposure times, which comprises:

first means rendered effective at the start of the flash for generating a control signal that varies in proportion to the light energy emitted from the flash tube;

first and second normally disabled thyristors;

first and second resistive means for individually connecting the transconductive paths of each of the thyristors across the flash tube to respectively establish first and second shunting paths for the flash tube when their associated control electrodes are excited, the resistance of each of the first and second resistive means being sufficiently low so that the resistance of the associated shunting path is lower than that of the flash tube but sufficiently high relative to that of the associated thyristor to set the resulting time constant of each of the shunting paths and the flash capacitor at a value which delays the extinction of the emitted light energy after such interruption for an interval sufficient to make the film optical density more nearly proportional to the predetermined quantity of light energy;

first means for coupling the output of the first generating means to the control electrode of the first thyristor for triggering the latter into conduction when the control signal has reached a predetermined value;

second means responsive to current flow through the first thyristor during conduction thereof for generating a proportional voltage of a magnitude sufficient to trigger the second thyristor into conduction; and second means for coupling the output of the second generating means to the control electrode of the second thyristor.

* * * * *